March 29, 1960 S. I. MacDUFF 2,930,361
HYDRAULIC REACTION CONTROL
Filed Sept. 23, 1954 3 Sheets-Sheet 1

INVENTOR.
STANLEY I. MacDUFF
BY
ATTORNEY

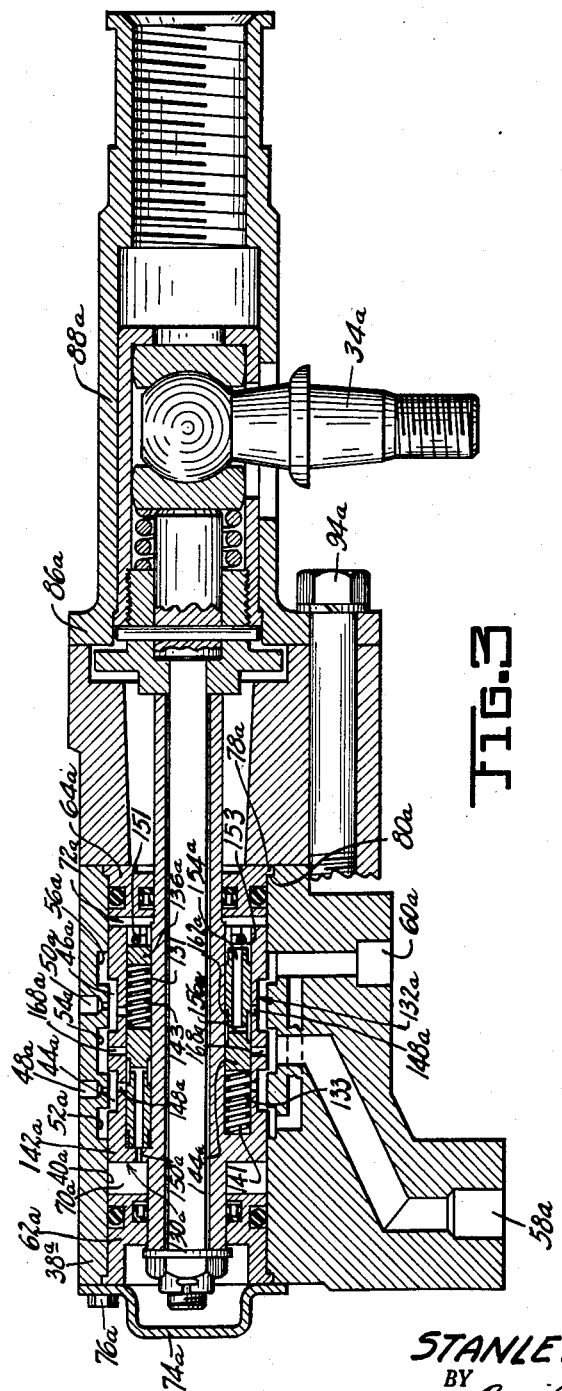

United States Patent Office 2,930,361
Patented Mar. 29, 1960

2,930,361

HYDRAULIC REACTION CONTROL

Stanley I. MacDuff, South Bend, Ind., assignor to Bendix Aviation Corporation, South Bend, Ind., a corporation of Delaware Application September 23, 1954, Serial No. 457,836

4 Claims. (Cl. 121—46.5)

This invention concerns fluid power steering and more particularly a control valve for such mechanism.

Hydraulic power steering for vehicles and particularly automobiles has passed from the stage of optional equipment to standard equipment on many of the present day cars. Power steering is no longer a luxury for use only on the high price car. Cars in all price ranges have adopted power steering. However, in spite of this wide acceptance by the motoring public there are still certain inherent problems associated with this new development. The need is for a system in which the "feel" or reaction felt by the operator is not substantially diminished at high vehicle speeds and is not excessive when parking. For example, on a given type of road, resistance to turning the wheels is greatest under static conditions. As the car starts moving, resistance to steering falls off rapidly and at high speeds for straight ahead position, steering is accomplished by barely any effort at all on the part of the operator. This is true in conventional non-power steering systems and even more pronounced where the power steering employed utilizes "feel" which is usually proportional to the effort required by the driver to steer the vehicle. In the latter case the "feel" or reaction is so slight that the driver acquires a completely detached feeling with respect to steering. In constructing a hydraulic power steering system having "feel" it must be decided at the outset whether extremely heavy "feel" under static conditions (during parking) with natural "feel" during high car speeds is desired or whether light "feel" during parking with a detached "feel" during high car speeds is preferred. Even a middle course has not been found to meet the steering standards established by industry.

It was not until the advent of the present invention that "feel" could be built into a hydraulic power steering system and controlled through the entire steering range from parking to high speeds.

An object of the invention is to provide "feel" in a power steering system for a vehicle which will not exceed a predetermined value when parking.

Another object of the invention is to provide "feel" in a power steering system for a vehicle which may be made a predetermined value even at high vehicle speeds.

An important object is to provide a regulating valve in a power steering system for a vehicle which maintains driver "feel" within a predetermined range.

A further object is to control the ratio of power to manual effort.

A still further object is to control the ratio of power to manual effort as well as the maximum magnitude of manual effort.

A primary object of the invention is to provide a control valve of the reaction type for power steering wherein the pressure creating the reaction may be replenished or bled off automatically to compensate for pressure changes above or below a predetermined value.

The above and other objects and features of the invention will be apparent from the following description of the apparatus taken in connection with the accompanying drawings which form a part of this specification, and in which:

Figure 3 represents a modification of the regulating device of Figure 1; and

Figure 1:
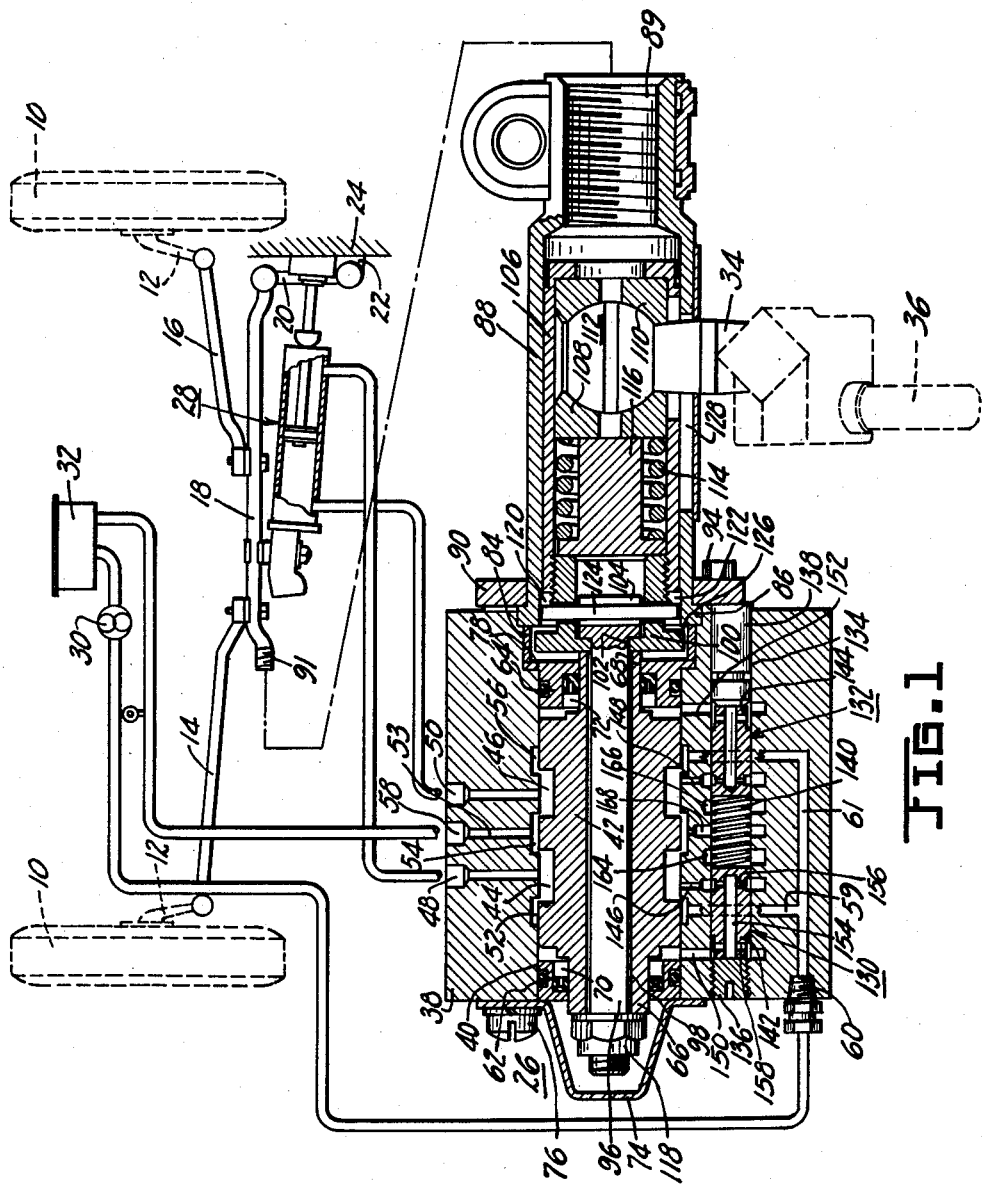
Figure 1 is a schematic showing of a hydraulic power steering system incorporating one form of my invention wherein the control valve is shown in enlarged section.

Referring now to Figure 1 of the drawings the reference numeral 10 designates the steerable wheels of a vehicle. Spindle arms 12 are associated with the wheels 10 and connected to the vehicle steering linkage comprising spindle tie rods or side links 14 and 16, cross tie rod 18, idler arm 20, and idler arm bracket 22 secured to the vehicle structure 24.

The hydraulic system with which the steering linkage is connected includes a control valve 26, power cylinder 28, pump 30, reservoir 32, and the connecting pipe lines to be hereinafter considered in more detail. The control valve 26 is actuated through ball stud 34 operatively connected to the steering shaft 36.

The control valve 26 comprises a housing member 38, provided with a bore 40, having a valve member 42 slidably received in the bore and movable in opposite directions from a normally neutral position for controlling flow. The valve member is formed with two annular channels 44 and 46 which communicate with cylinder ports 48 and 50 respectively. The bore 40 of the valve housing is provided with annular channels 52, 54 and 56. Annular channel 54 is in communication with a return port 58 by way of passage 53. Annular channels 52 and 56 communicate with an inlet port 60 through passages 59 and 61. The control valve is one form of open center type valve and when in its neutral position establishes flow between the inlet port 60 and return port 58 via the annular channels which are arranged in overlapping relationship.

Sealing bushings 62 and 64 are located at the reduced ends 66 and 68 of the valve member 42 to provide reaction chambers 70 and 72. Although the effective areas of the ends $A_1$ and $A_2$ of the valve member are unequal in the embodiment shown in Figure 1, as far as the present invention is concerned these areas could just as well be equal. It is an important aspect of this invention to be able to vary the reaction areas of these chambers at will so that the proper "feel" can be selected for the particular steering problem. These chambers 70 and 72 are in effect hydraulic pressure reaction means built into the control valve to oppose relative movement of the housing and valve members from neutral. That is, the hydraulic pressure communicated to these chambers, in a manner to be hereinafter described, acts on the members tending to oppose relative movement from neutral, and when so moved acts to restore them to neutral. The control valve utilizing unequal areas is described and claimed in my copending application Serial No. 264,814, filed January 3, 1952, now Patent Number 2,757,748, issued August 7, 1956.

The bushing 62 is retained in the bore by an end cap 74 which engages the outer side of the bushing. Bolts 76, only one of which is shown, secure the end cap to the housing member 38. The bushing 64 includes a flange 78 which engages a shoulder 80 formed in a counterbore 82 located at the end of the bore 40. A spacer ring 84 is arranged in the counterbore between the flange 78 and inner end 86 of a sleeve 88. A ring 90 slides over the sleeve 88 for engagement with a shoulder 92 formed at the inner end 86 of the sleeve for securing the sleeve 88, spacer ring 84, and bushing 64 in assembled relationship. Bolts 94, only one of which is shown, hold the ring 90 against the end of the housing member.

The valve member 42 is operatively connected to the ball stud 34 for sliding movement in the bore. The connection to the stud is an assembly of parts comprising a bolt 96, extending through a central passage 98 of the valve member, a stop (bushing) 100 having an opening 102 therein which passes the small diameter of the bolt but not the enlarged end 104, an inner sleeve 106 the inner end of which threadedly engages the stop bushing 100, members 108 and 110 providing sockets for a spherical end 112 of the stud, a spring 114, and ball socket stop member 116. With nut 118 tightened down against the end 66 of the valve member, movement of the ball stud will cause the valve member and assembly to move as a unit in the housing 38 and sleeve 88. The inner end of the sleeve 106 is slotted at 120 and 122 to receive the ends of pin 124 to prevent rotation of the assembly in the bore. The pin 124 passes through the stop bushing 100 and enlarged end 104 of the bolt 96 to hold the latter against turning when applying the nut 118.

It will be noted that the stop bushing 100 has a radially extending flange 126 which engages the inner end 86 of the sleeve 88 when the valve member is moved to the right, as viewed in Figure 1, and the outer side of the sealing bushing 64 when the valve member is moved to the left. This positive engagement between the stop bushing 100 and the housing member 38 after a predetermined movement of the valve member permits manual steering in the event of power failure. The end of sleeve 88 is threaded at 89 to be connected to end 91 of the cross tie rod 18. The sidewall of the sleeve 88 is provided with an axially extending opening 128 to permit movement of the ball stud as aforementioned.

The invention herein claimed concerns the utilization of means with a hydraulic reaction type control valve capable of controlling the reaction to a predetermined value. In Figure 1, this is done by regulating valve means 130 and 132 which control the pressure in chambers 70 and 72 respectively. The regulating valves are arranged in a bore 134 of the housing member. Plugs 136 and 138 close the ends of the bore against leakage to atmosphere. A spring 140 arranged between the adjacent ends of the valve elements 142 and 144 urges the respective elements against the plugs 136 and 138. The spring is designed to be overcome when the pressure acting over the areas of the valve elements adjacent the plugs reaches a predetermined value. Passages 146 and 148 connect annular channels 44 and 46 respectively with the bore 134. Passages 150 and 152 connect the chambers 70 and 72 respectively with the bore 134.

Since the valve elements 142 and 144 are identical only one will be described. An axial passage 154 connects radial passages 156 with radial passages 158. The outer end 160 of each valve element is of reduced diameter so that the ends of the valve elements will not cover the passages 150 and 152. The radial passage 156 terminates at its outer end in an annular groove 162 formed in the exterior surface of the element. The axial width of the groove 162 of each element is less than the axial distance between adjacent edges of passages 146 and counterbore 164, on the one hand, and passage 148 and counterbore 166, on the other hand. A passage 168 connects bore 134 with annular channel 54, which is connected to the return port 58. With the valve elements shifted inwardly against the spring 140 so that the edges of the groove of each element lie between the adjacent edges of the passages 146 and 148 and the counterbores 164 and 166 respectively, communication is cut off between the chambers 70 and 72. Any further shifting inwardly of the valve elements so that the edge of the groove of each element overlaps the edge of its associated counterbore will establish communication between the chambers and the return port 58 via the central portion of the bore 134 and passage 168.

The regulating valves 130 and 132 are normally biased by the spring 140 to a position where the pressures existing in the annular channels 44 and 46 are communicated to the reaction chambers 70 and 72 respectively. The pressure regulating aspect of the invention is especially desirable in a control valve of the type herein disclosed. That is, for a given predetermined reaction cutoff pressure the valve elements will actually shuttle so that the annular groove 162 will either lie between the passages and the counterbores or communicate with one or the other of them. This arrangement has the important advantage of taking care of any pressure changes in the chambers due to leakage. A valve which acts only as a cutoff for a predetermined pressure without regulating would fall far short of the advantages of the device of the invention.

Figure 2:
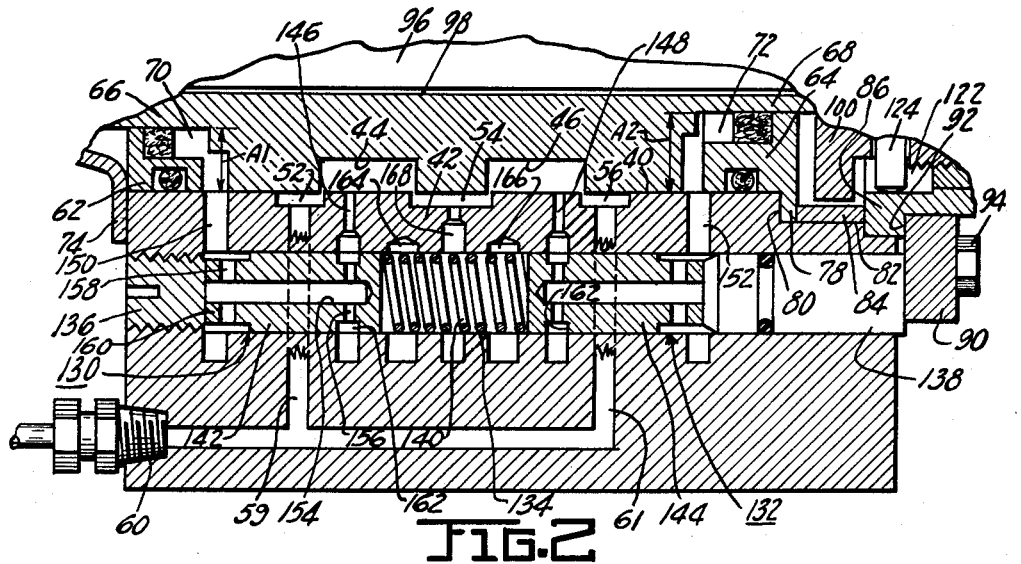
Figure 2 is an enlarged fragmentary section of Figure 1 showing the regulating valves.

Operation of the steering mechanism is as follows:

Since the principle of the apparatus of the invention is the same for all embodiments disclosed herein the description which follows will be directed specifically to Figures 1 and 2 in order to simplify the illustration.

With the parts of the control valve 26 in the position shown in Figures 1 and 2 the valve is in hydraulic balance. This is the neutral position of the valve. Fluid under pressure enters inlet port 60, divides into the annular channels 52 and 56, from whence the fluid passes into the annular channels 44 and 46 respectively, and from these latter channels the fluid is directed into the annular channel 54 which is connected to the return port. The regulating valves 130 and 132 are in a position at this time to connect the pressures existing in the annular channels 44 and 46 to the chambers 70 and 72 respectively. The pump 30 is now doing only enough work to circulate the hydraulic fluid through the system.

Let us assume that it is desired to turn the wheels to the left in Figure 1. This will require shifting the valve member to the right. This movement of the valve member tends to restrict communication between annular channels 44 and 52 and increase communication between annular channels 46 and 56. Since annular channel 44 is connected to the chamber 70 via the passage 146, regulating valve 130, and passage 150, pressure in chamber 70 will be reduced. Also since annular channel 46 is connected to the chamber 72 via the passage 148, regulating valve 132, and passage 152, pressure in chamber 72 will increase. This pressure in chamber 72 acts on the end of the valve member and the bushing 64 opposing further movement of the valve member with a force equal to the effective area of the movable wall multiplied by the unit pressure in the chamber. This force which is in the form of a reaction force is transmitted to the operator of the vehicle, through the ball stud 34.

If the resistance offered to steering becomes sufficiently great to cause the pressure required for power assistance to exceed a predetermined value, regulating valve 132 will come into action, shutting off communication between the chamber 72 and the annular channel 46. From this time on, the reaction or "feel" transmitted to the operator will remain the same regardless of an increase in the pressure in the annular channel 46, if such an increase in pressure is necessary in the cylinder 28 to turn the wheels. If during this turning operation there should be any decrease or increase in pressure in the chamber 72 the valve element will shift to the right or left respectively in order to sustain the pressure in the chamber at the predetermined value. This insures that the operator will have "feel" at all times. Only a regulating valve capable of adjusting itself to varying pressures in the chamber 72 will meet this requirement. That is, the valve 132 controlling the pressure in chamber 72 must respond to pressures in that chamber above and below a predetermined value in order to maintain said predetermined pressure during steering when the "feel" or reaction attains a given amount.

In making a turn to the right the regulating valve 130 would function in the same manner as described for a left turn in connection with regulating valve 132.

Figure 3 represents a modified form of open center control valve wherein the regulating valve means is incorporated into the valve spool or valve member. In Figure 3 parts corresponding to those already described in connection with the embodiment of Figures 1 and 2 are given the same reference numeral with the subscript *a* affixed thereto. The valve of Figure 3 comprises a housing member 38a, provided with a bore 40a, having a valve member 42a slidably positioned in the bore for movement in opposite directions from a normally neutral position. Two annular channels 44a and 46a are located in the valve member and communicate with cylinder ports 48a and 50a respectively. Annular channels 52a, 54a, and 56a are located in the bore of the housing member and communicate with an inlet port 60a and return port 58a. As is the case in all open center type valves communication between all the ports is established with the valve in neutral position.

The ends of the bore 40a are equipped with sealing bushings 62a and 64a to provide reaction chambers 70a and 72a. An end cap 74a is secured to the housing member by bolts 76a, only one of which is shown. The end cap overlies the bore so as to engage the outer end of the bushing 62a. The bushing 64a is formed with a radial flange 78a which engages a shoulder 80a formed in the bore. A housing extension or sleeve 86a is securely fastened to the end of the housing member adjacent the bushing 64a by bolts 94a, only one of which is shown. The flange 78a is held between the shoulder 80a and the end of the housing extension 86a.

In the modified form of Figure 3 regulating valves 130a and 132a are located in bores 131 and 133 of the valve member 42a. Regulating valve 130a controls the fluid pressure in the chamber 70a. Regulating valve 132a controls the fluid pressure in the chamber 72a. Since both regulating valves are identical only valve 132a will be described in detail. Valve element 144a is provided with an axial passage 154a and the radial passages 156a connecting the axial passage with an annular groove 162a located in the exterior surface of the valve element. A passage 148a connects the annular channel 46a with the bore 133 in which the valve element slides. A passage 168a connects the bore 133 with the annular channel 54a. A spring 141, calibrated according to the maximum desired pressure build up in the chamber 72a, is interposed between the closed end of the bore 133 and the left side of the valve element 144a thus biasing the latter against a stop ring 151 arranged in a groove 153.

With the regulating valve 132a in the position shown the annular groove 162a overlies the passage 148a thereby communicating the annular channel 46a with chamber 72a. The axial length of the annular groove 162a is less than the distance between the adjacent edges of the passages 148a and 168a so that movement of the valve element 144a to the left of the position shown, as the result of pressure buildup in the chamber 72a, will cut off the pressure entering through the passage 148a. At this time the edges of the groove 162a are located between the adjacent edges of the passages 148a and 168a but not overlying them. Any increase in pressure in the chamber 72a beyond a given value will cause further movement of the valve element to the left until the groove 162a overlaps the passage 168a bleeding off excess pressure to annular channel 54a which is connected to the return port 58a. If there should be any leakage from the chamber 72a when the valve element is positioned so that the groove is between the edges of the passages 148a and 168a the valve element will shift to the right so as to connect the groove with the pressure passage 148a thus restoring the chamber pressure to its predetermined value.

The regulating valve 130a has its valve element 142a arranged in the bore 131 to control hydraulic reaction pressure in the chamber 70a. In the position shown hydraulic pressure is communicated to the chamber 70a via passages 148a and 150a. Pressure in chamber 70a above a predetermined value urges the valve element 142a to the right against spring 143 interposed between the valve element and a plug 136a, retained in the bore by the stop ring 151. Thus excess pressure in the chamber 70a is bled off through passage 168a connecting the bore 131 with the annular channel 54a.

The connection between the valve member 42a and the ball stud 34a is similar to that shown in Figures 1 and 2 and since it does not form a part of the invention will not be described again in relation to Figure 3.

Figure 4:
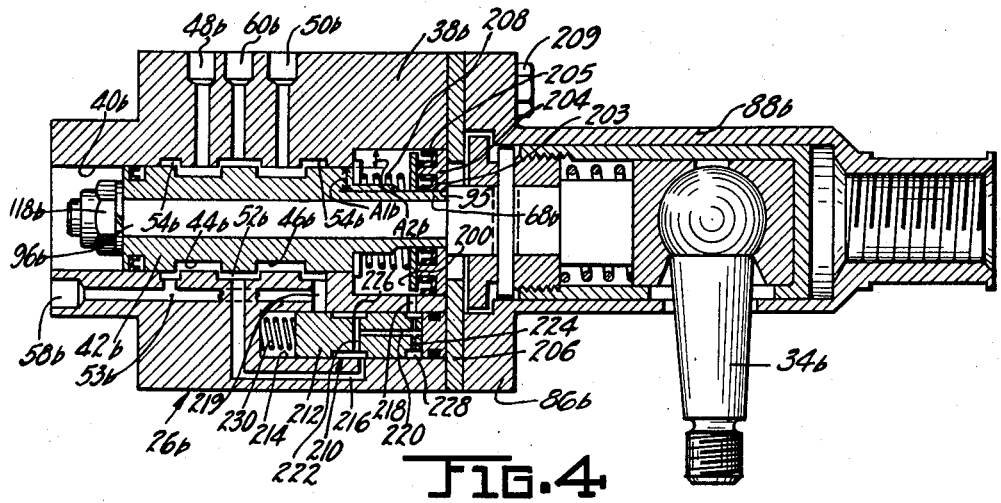
Figure 4 illustrates a further modification of the regulating device of the invention.

Figure 4 is a further modification of the invention wherein the regulating valve means controls hydraulic pressure to a single chamber. In Figure 4 parts corresponding to those already described in connection with the embodiment of Figures 1 and 2 are given the same reference numeral with the subscript *b* affixed thereto. The control valve 26b of Figure 4 includes a housing member 38b, having a bore 40b, in which valve member 42b is slidably positionable in opposite directions from a normally neutral position in the bore. This is also an open center type valve in which annular channels 44b and 46b of the valve member 42b overlap the annular channels 52b and 54b in the housing member when the control valve is in neutral position, thus establishing communication between all the ports at that time. Return port 58b is connected to the annular channels 54b via passage 53b. Cylinder ports 48b and 50b are connected to the annular channels 44b and 46b respectively of the valve member. Inlet port 60b is connected to the annular channel 52b.

The hydraulic pressure reaction means of Figure 4 includes a chamber 200 formed in a counterbore 202 at the end of the bore 40b. A sealing bushing 204, which provides a movable wall for the chamber, is slidably carried at reduced end 68b of the valve member. The bushing 204 is equipped with seals 203 and 205 which seal on the reduced end and the counterbore respectively. A shoulder 95 of the bolt 96b engages the right side of the bushing so as to move the same to the left upon movement of the valve member to the left. The shoulder 95 is held tightly against the reduced end 68b of the valve member by tightening nut 118b. When the valve member is moved to the right the reduced end 68b slides through the bushing or movable wall 204. A plate 206 overlies the counterbore 202 to be engaged by the outer periphery of the bushing 204, thus holding it from movement to the right upon movement of the valve member in that direction. The plate 206 is held between flange 86b of sleeve 88b by bolts 209, only one of which is shown. A centering spring 208 is interposed between the bushing 204 and valve member 42b. The use of such a spring to center the valve member is optional depending upon design. The effective area on which hydraulic pressure acts tending to oppose movement of the valve member from neutral will be either $A_{1b}$ or $A_{2b}$ determined by the direction of movement of the valve member. A regulating valve 210 controls the hydraulic pressure in the chamber 200 to a predetermined value. The regulating valve comprises a valve element 212 slidably located in a bore 214 which communicates with the inlet port through a passage 216 and with the chamber 200 via passage 218. A passage 219 connects the bore 214 with the annular channel 54b. The valve element 212 is provided with an axial passage 220 and radial passages 222 and 224 connecting the axial passage with circumferential grooves 226 and 228 respectively. A spring 230 is interposed between the end of the valve element and the end of the bore in order to bias the valve element to a position where communication is established between the inlet port and the chamber for pressures existing therein not exceeding a predetermined value. The axial distance between the edges of the groove 226 is less than the distance between the adjacent edges of the passages 219 and 216 in order that pressure in the chamber 200 will not bleed off for a given movement of the valve element to the left as a result of a predetermined pressure in the chamber. An increase in pressure in the chamber beyond a predetermined value will move the valve element so that the passage 219 is connected to the recess 226. This will relieve the pressure in the chamber, thus permitting the valve element to shift to the right so as to cut off communication between the annular channel 54b and the chamber 200 via the passage 219.

From a description of the various modifications it is quite clear that I have invented a device for use with hydraulic power steering providing the following advantages:

(a) Limited reaction or "feel" during parking;
(b) Normal reaction or "feel" during high vehicle speed; and
(c) Absolute control over either (a) or (b) without detriment to the other.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. A control valve comprising a housing member with a bore therein, a valve member in the bore, an inlet port, two working ports, a reservoir port, annular channels in the bore and valve member in communication with said ports, the annular channels in one of said members overlapping the annular channels in the other of said members, said members being relatively movable from a neutral position for controlling flow in said channels, hydraulic pressure reaction means subject to variable pressure derived from said inlet port for opposing relative movement of said members from neutral, passage means located in said valve member for communicating said reaction means with said inlet port, and pressure regulating means located in said passage means, said regulating means including two regulating valves responsive to the hydraulic pressure opposing relative movement of said members for limting said hydraulic pressure to a predetermined value, each regulating valve functioning independently for a given direction of relative movement of said members from neutral.

2. A valve comprising a housing member with a bore therein, a valve member in the bore, said members having normally neutral positions with respect to each other, an inlet port, an outlet port, two working ports, said members together providing annular channels communicating with the ports, said members being relatively movable from said neutral positions for controlling flow, two chambers, one located at each end of one of said members, and communicating respectively with the working ports, said chambers being formed with opposed faces provided by each of said members, relative movement of said members from said neutral position creating differential pressures in the two working ports which pressures are transmitted to said members where a force is developed in one of said chambers proportional to the differential in pressure and tending to restore the members to their neutral position, a second bore formed in said housing member, two pressure regulating valves located in said second bore, one for each chamber, for limiting the pressure therein to a predetermined value, and means for establishing relative movement of said members from their neutral positions.

3. In a power steering system including a source of fluid pressure, a fluid motor operably connected to a steering part, and a control valve for said motor comprising a manually actuated, axially movable spool element and a housing confining said spool element having an inlet passageway and an exhaust passageway therein, said valve having associated therewith means defining a chamber at one end of said spool element adapted to confine a body of fluid serving to resist movement of said spool element, said chamber having communication with said source via a conduit in said spool element, the combination of a spring-biased, fluid-actuated member adapted to block fluid flow from said conduit to said chamber when the pressure therein reaches a predetermined value set by the spring biasing, said member being located in a bore formed in said spool element and having a pressure surface against which fluid derived from said inlet passageway is applied, and means providing for the escape of fluid from said chamber to said exhaust passageway on movement of said spool element following the blocking of said conduit.

4. A control valve as defined in claim 1 wherein the hydraulic pressure reaction means includes two reaction chambers, one of which is located at one end of said valve member and the other of which is located at the other end of said valve member.

References Cited in the file of this patent
UNITED STATES PATENTS

| | | |
|---|---|---|
| 1,952,690 | Strom | Mar. 27, 1934 |
| 2,596,242 | Hill | May 13, 1952 |
| 2,617,257 | Douglas | Nov. 11, 1952 |
| 2,608,263 | Garrison | Aug. 26, 1952 |
| 2,824,314 | Davis | Feb. 25, 1958 |